United States Patent
Chang

(10) Patent No.: US 9,774,791 B2
(45) Date of Patent: Sep. 26, 2017

(54) METHOD AND RELATED CAMERA DEVICE FOR GENERATING PICTURES WITH OBJECT MOVING TRACE

(71) Applicant: Wistron Corporation, New Taipei (TW)

(72) Inventor: Yao-Tsung Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 15/149,169

(22) Filed: May 8, 2016

(65) Prior Publication Data

US 2017/0171472 A1    Jun. 15, 2017

(30) Foreign Application Priority Data

Dec. 11, 2015 (TW) ............................. 104141655 A

(51) Int. Cl.
| | |
|---|---|
| *H04N 5/262* | (2006.01) |
| *H04N 5/232* | (2006.01) |
| *H04N 5/235* | (2006.01) |
| *H04N 5/265* | (2006.01) |

(52) U.S. Cl.
CPC ......... *H04N 5/2621* (2013.01); *H04N 5/2353* (2013.01); *H04N 5/23296* (2013.01); *H04N 5/265* (2013.01)

(58) Field of Classification Search
None
See application file for complete search history.

(56) References Cited

U.S. PATENT DOCUMENTS

| | | | |
|---|---|---|---|
| 9,264,630 B2* | 2/2016 | Kakkori | H04N 5/265 |
| 2006/0133786 A1* | 6/2006 | Teramoto | H04N 5/2253 396/55 |
| 2013/0208960 A1* | 8/2013 | Reisman | G06T 3/4038 382/128 |
| 2014/0218552 A1* | 8/2014 | Huang | G11B 27/034 348/218.1 |

FOREIGN PATENT DOCUMENTS

CN       103973968 A      8/2014

OTHER PUBLICATIONS

Office action dated Jun. 16, 2016 for TW application No. 104141655, filing date: Dec. 11, 2015, p. 1 line 14, pp. 2~4 and p. 5 line 1~23.

* cited by examiner

*Primary Examiner* — James Hannett
(74) *Attorney, Agent, or Firm* — Winston Hsu

(57) ABSTRACT

A method of generating pictures with an object moving trace includes controlling a camera lens to capture a first picture at a first time, a second picture at a second time and a third picture at a third time, comparing the first and second pictures to generate a first image mask and a second image mask, keeping a first area of the first or second picture according to the first image mask and removing a second area of the first or second picture according to the second image mask to generate a fourth picture, and blending the third and fourth pictures according to a weighting to generate a fifth picture with an object moving trace.

16 Claims, 7 Drawing Sheets

METHOD AND RELATED CAMERA DEVICE FOR GENERATING PICTURES WITH OBJECT MOVING TRACE

BACKGROUND OF THE INVENTION

1. Field of the Invention

The present invention relates to a method and related camera device for generating pictures with object moving trace, and more particularly, to a method and related camera device for generating pictures with object moving trace via continuous shooting and image processing.

2. Description of the Prior Art

In recent years, digital photography technology advances rapidly and becomes popular, various types and standards of cameras are brought to the market place. Further, handheld devices (e.g., smart phones and tablet computers) are equipped with built-in camera device to capture images and record videos, which allows users to share daily events at any times and any occasions to bring funs to the users.

Since professional photographers are specialized in mastering camera devices to capture various types of pictures, such as a picture with an object moving trace. Specifically, this type of picture shows a sharp object which is moving when being captured, and the background of the picture is blurry and radial to be radiated from the object toward the edges of the picture. In order to capture the picture with object moving trace, a shutter speed must be long enough, so the background can be blurry. Because of the long shutter speed, a small aperture is required to keep the object in focus and avoid the object from blurring due to handshaking. A small ISO sensitivity is also required to avoid overexposure. Meanwhile, the photographer has to control zoom-in or zoom-out of the lens to produce the blurry and radial background.

As can be seen, it is quite difficult for general users without professional skills to capture this type of picture. Therefore, how to make general users to easily capture the picture with object moving trace has become a challenge in the industry.

SUMMARY OF THE INVENTION

It is therefore an objective of the present invention to provide a method and related camera device for generating pictures with object moving trace, which allows general users to easily take pictures with object moving trace.

The present invention discloses a method of generating pictures with an object moving trace. The method includes outputting a control signal to control a camera lens to capture a first picture at a first time, a second picture at a second time and a third picture at a third time; comparing the first picture and the second picture to generate a first image mask and a second image mask; keeping a first area of the first or second picture corresponding to the first image mask, and removing a second area of the first or second picture corresponding to the second image mask to generate a fourth picture; and blending the third picture and the fourth picture according to a weighting to generate a fifth picture with an object moving trace.

The present invention further discloses a camera device for generating pictures with object moving trace. The camera device includes a controller for outputting a control signal; a lens coupled to the controller for capturing a first picture at a first time, a second picture at a second time and a third picture at a third time according to the control signal; and a memory unit, coupled to the controller, for storing a program code to instruct the controller executing a process of generating pictures with object moving trace. The process includes comparing the first picture and the second picture to generate a first image mask and a second image mask; keeping a first area of the first or second picture corresponding to the first image mask, and removing a second area of the first or second picture corresponding to the second image mask to generate a fourth picture; and blending the third picture and the fourth picture according to a weighting to generate a fifth picture with an object moving trace.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
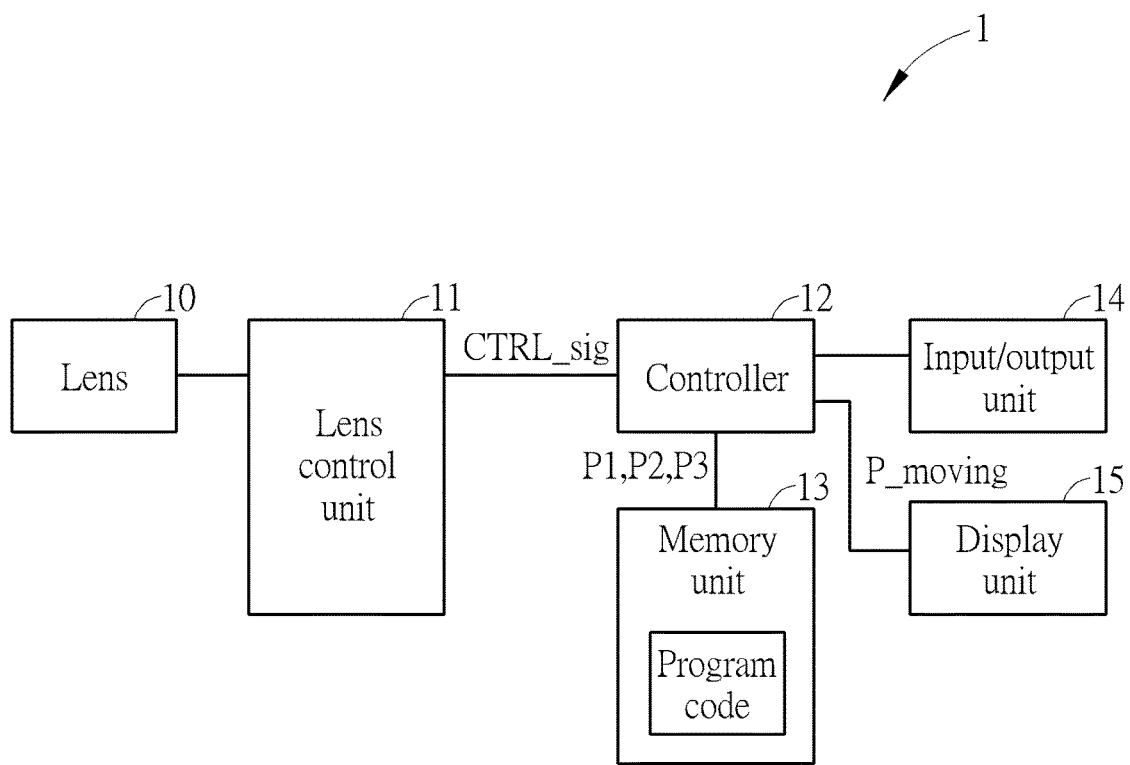
FIG. 1 is a functional block diagram of a camera device according to an embodiment of the present invention.

FIG. 1 is a functional block diagram of a camera device 1 according to an embodiment of the present invention. The camera device 1 generates a sharp picture with an object and a blurry picture with radial background radiated from the object, and then generates a picture with object moving trace by merging the sharp picture and the blurry picture via image processing. The camera device 1 includes a lens 10, a lens control unit 11, a controller 12, a memory unit 13, an input/output unit 14 and a display unit 15.

The lens control unit 11 is coupled to the lens 10 and the controller 12, for controlling the lens 10 to perform continuous shooting according to a control signal CTRL_sig, e.g., capturing three continuous pictures. The control signal CTRL_sig indicates a continuous shooting speed (e.g., time interval between two continuous pictures), a shutter speed, an aperture for single picture, an ISO sensitivity and zoom-in or zoom-out operation. The memory unit 13 is coupled to the controller 12, and can be a permanent memory device for storing a program code and captured pictures and videos. Or, the memory unit 13 can be a temporary memory device for holding the program code to be executed by the controller 12. The input/output unit 14 is coupled to the controller 12, functions as an input interface for receiving input commands from the user. Or, the input/output unit 14 functions as an output interface for outputting captured pictures and videos to other electronic devices. The display unit 15 is coupled to the controller 12 for displaying instant images, previewing pictures, or displaying operating interface. The controller 12 is coupled to the lens control unit 11, the memory unit 13, the input/output unit 14 and the display unit 15, for outputting the control signal CTRL_sig to control the lens 10 to perform continuous shooting, and generating a picture P_moving with object moving trace, where the controller 12 performs the program code to generate three continuous pictures P1, P2 and P3, and then generate the picture P_moving with object moving trace according to the pictures P1, P2 and P3.

Figure 2:
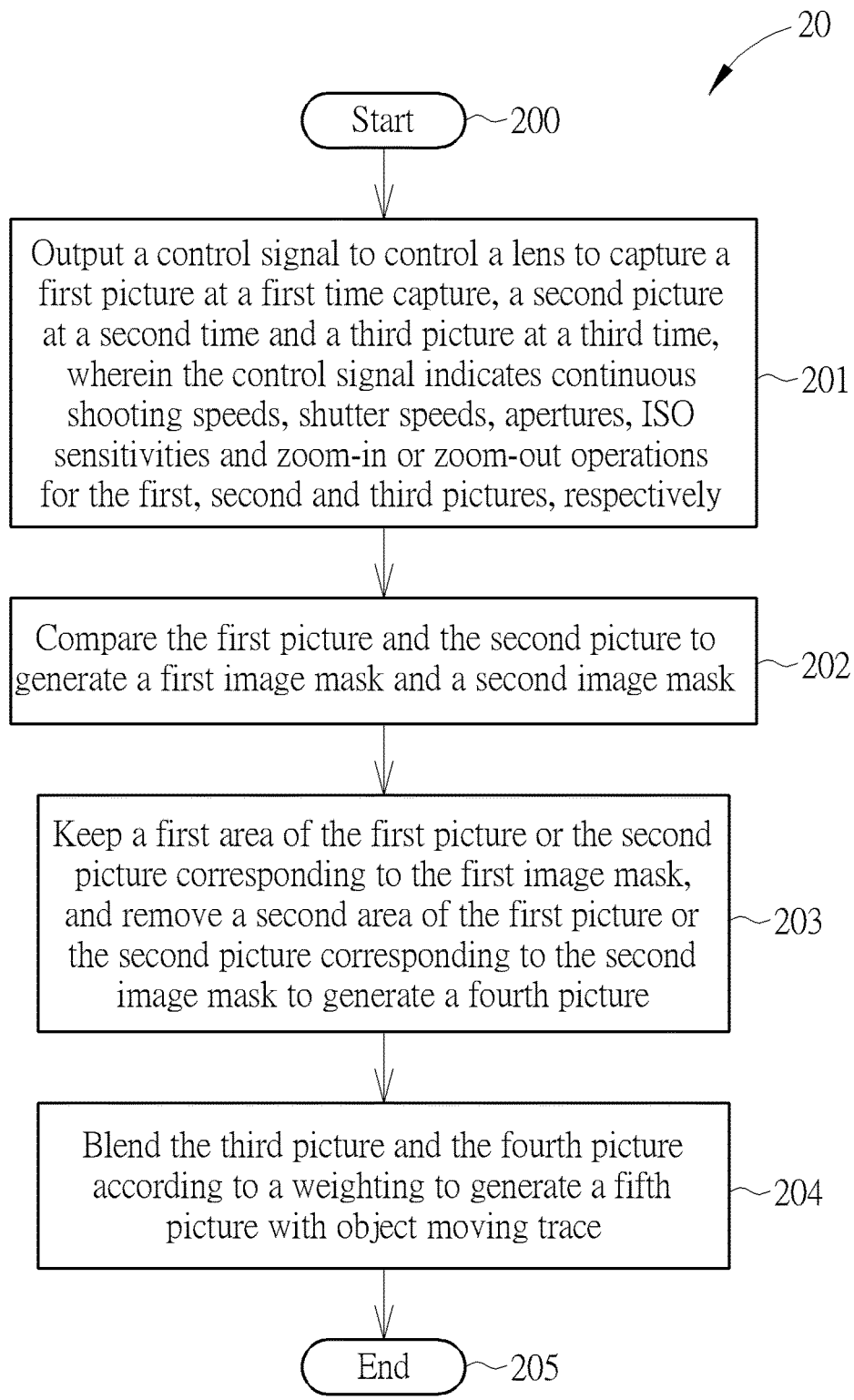
FIG. 2 is a flowchart of a process for generating a picture with an object moving trace according to an embodiment of the present invention.

FIG. 2 is a flowchart of a process 20 for generating pictures with an object moving trace according to an embodiment of the present invention. The process 20 can be compiled into a program code stored in the memory unit 13, for controlling the lens 10 to perform continuous shooting, thereby generate the three continuous pictures P1, P2 and P3. Then, the controller 12 generates the picture P_moving with object moving trace according to pictures P1, P2 and P3. As shown in FIG. 2, the process 20 includes the following steps.

Step 200: Start.

Step 201: Output a control signal to control a lens to capture a first picture at a first time capture, a second picture at a second time and a third picture at a third time, wherein the control signal indicates continuous shooting speeds, shutter speeds, apertures, ISO sensitivities and zoom-in or zoom-out operations for the first, second and third pictures, respectively.

Step 202: Compare the first picture and the second picture to generate a first image mask and a second image mask.

Step 203: Keep a first area of the first picture or the second picture corresponding to the first image mask, and remove a second area of the first picture or the second picture corresponding to the second image mask to generate a fourth picture.

Step 204: Blend the third picture and the fourth picture according to a weighting to generate a fifth picture with object moving trace.

Step 205: End.

According to the process 20, in Step 201, the camera device 1 captures three continuous pictures to generate the picture with object moving trace by image processing. In Step 202, the camera device 1 obtains a first image mask and a second image mask according to first picture and second picture. The first area corresponding to the first image mask is used for displaying an object, and the second area corresponding to the second image mask is used for displaying a background. Therefore, in Step 203, the camera device 1 keeps the first area of the first picture or second picture corresponding to first image mask, and removes the second area of the first picture or second picture corresponding to second image mask, so as to generate the fourth picture. Note that for capturing the first picture and second picture, the shutter speed can be set to a short shutter speed to capture sharp object and background. For capturing the third picture, the shutter speed can be set to a long shutter speed, and the lens simultaneously zooms in (or zooms out) when the shutter of the lens is open, by this way, the third picture becomes blurry and shows radial pattern that radiates from the center of itself. Finally, in Step 204, the camera device 1 blends the third picture and the fourth picture according to the weighting to generate the fifth picture with object moving trace. As a result, by the process 20, general users can easily take the picture with object moving trace.

Figure 3:
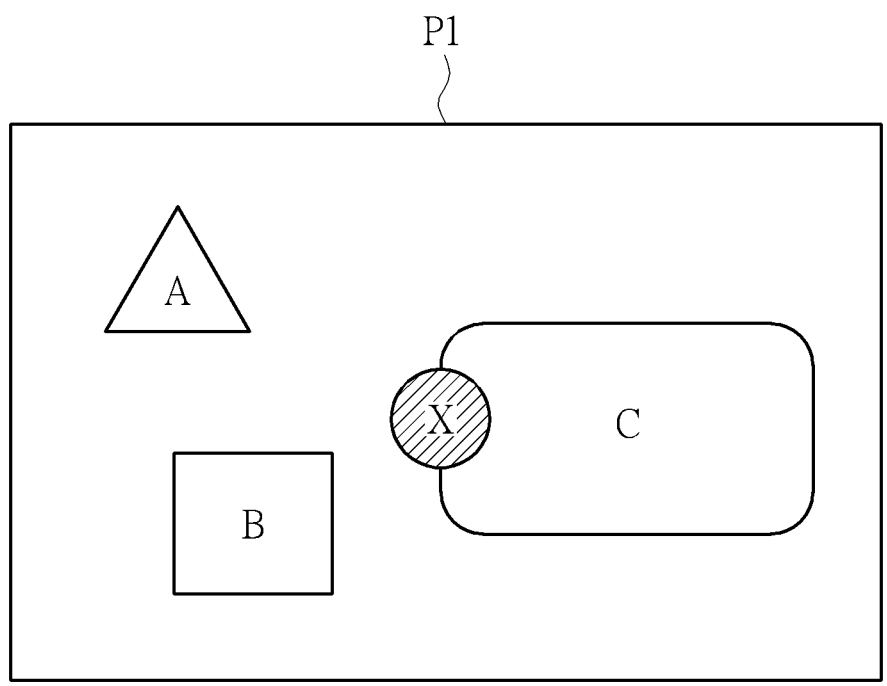
FIG. 3 to FIG. 7 illustrate image processing results performed by the camera device of FIG. 1 according to an embodiment of the present invention.
Figure 4:
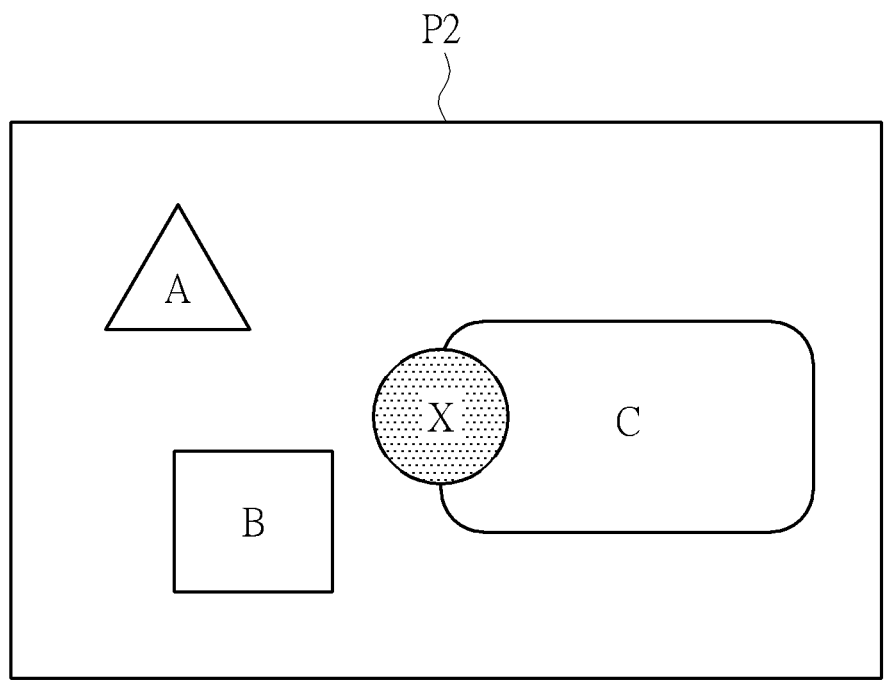
Figure 5:
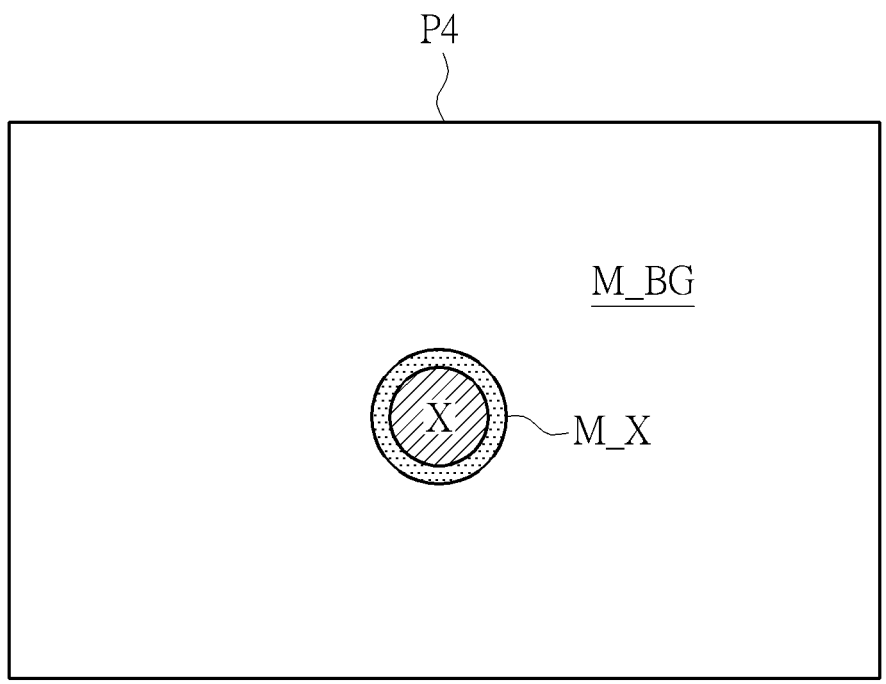
Figure 6:
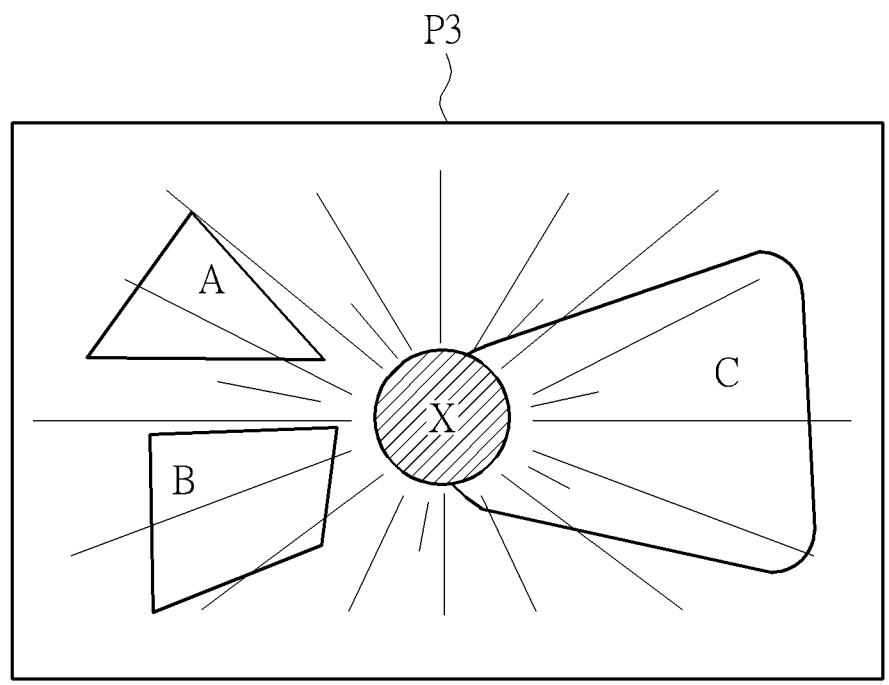
Figure 7:
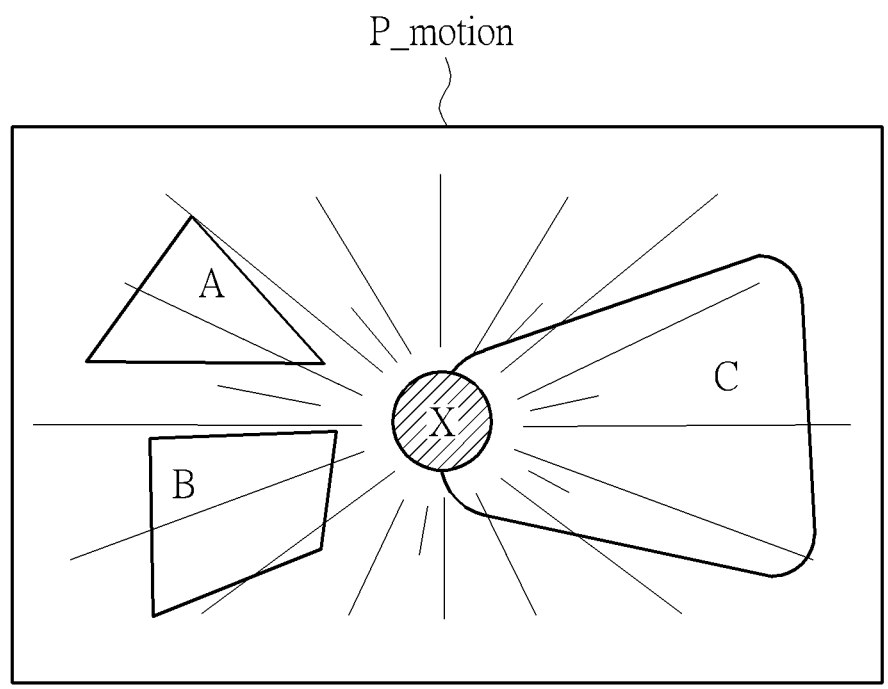

FIG. 3 to FIG. 7 illustrate image processing results performed by the camera device 1 to generate the picture P_moving with object moving trace according to an embodiment of the present invention. FIG. 3 illustrates the first picture P1 captured at the first time, FIG. 4 illustrates the second picture P2 captured at second time, FIG. 5 illustrates the fourth picture P4 only with the moving object, FIG. 6 illustrates the third picture P3 captured at the third time, and FIG. 7 illustrates the fifth picture P_moving with object moving trace.

As shown in FIG. 3 and FIG. 4, there are four objects in the pictures P1 and P2, wherein objects A, B and C are still, and an object X is moving. Given that a user is still and the moving object X in front of the user approaches toward the lens 10, in such a situation, the moving object X becomes larger or is displaced in the picture P2. In other words, the moving object X looks smaller in the picture P1 captured at the first time capture (which is denoted with slash patterns), while the moving object X looks larger in the picture P2 captured at the second time (which is denoted with dot patterns). In addition, since the objects A, B and C are still, their sizes and shapes remain the same in both the pictures P1 and P2 whenever they are captured.

Once the pictures P1 and P2 are stored in a form of digital data, a comparison result can be generated by comparing pixel values at a same coordinate of the pictures P1 and P2, and image masks M_X and M_BG (which are illustrated in FIG. 5) can be further defined according to the comparison result. Since the sizes and shapes of the objects A, B and C remains the same in the pictures P1 and P2, the pixel values associated with the objects A, B and C in the pictures P1 and P2 should be the same (e.g., pixel represented by a coordinate (R, G, B) should have the same values in the pictures P1 and P2). Accordingly, when the pixel values associated with the objects A, B and C in the pictures P1 and P2 are compared to obtain a comparison result, it can infer that the compared pixels of the pictures P1 and P2 locate in the image mask M_BG if the comparison result (or pixel value difference) is substantially equal to zero. On the other hand, since the moving object X becomes larger or is displaced in the picture P2, the pixel values associated with the moving object X in the pictures P1 and P2 should be different. Accordingly, when the pixel values associated with the moving object X in the pictures P1 and P2 are compared to obtain a comparison result, it can infer that the compared pixels of the pictures P1 and P2 locate in the image mask M_X if the comparison result (or pixel difference) is substantially not equal to zero.

In one embodiment, a threshold can be set to be a reference for determining whether the pixels of the pictures P1 and P2 is the background or the moving object. For example, the compared pixels of the pictures P1 and P2 locate in the image mask M_BG if the comparison result indicates that the pixel value difference of the pictures P1 and P2 is substantially smaller than the threshold; the compared pixels of the pictures P1 and P2 locate in the image mask M_X to be associated with the moving object if the comparison result indicates that the pixel value difference of the pictures P1 and P2 is substantially greater than the threshold.

As a result, in FIG. 5, the image mask M_X and image mask M_BG can be defined according to the comparison results of the pictures P1 and P2, wherein the pixels associated with the moving object are kept in the image mask M_X, and the pixels associated with the background are removed from the image mask M_BG. Therefore, once the moving object X of the picture P1 (or P2) is kept and the background objects A, B and C are removed from the picture P1 (or P2) according to the image masks M_X and M_BG, the picture P4 only containing the moving object X can be generated.

In FIG. 6, the moving object X looks more large (denoted with slash patterns) since the picture P3 is captured at the third time later than the first time, i.e., first time is prior to the second time, and the second time is prior to the third time. In one embodiment, the picture P3 can be captured prior to the picture P1 being captured, i.e. the third time is prior to the first time, and the first time is prior to the second time, so the moving object X looks smaller and the background is relatively large in the picture P3. In addition, the shutter speed is set to a long shutter speed for capturing the picture P3, and the lens simultaneously zooms in (or zooms out) when the shutter of the lens is open, by this way, the picture P3 looks blurry and shows radial pattern that radiates from the center of itself.

Finally, in FIG. 7, the picture P4 are directly added onto the picture P3 since the background of the picture P4 has been removed, and overlapping areas of the pictures P3 and P4 can be blended according to a weighting, e.g., Alpha blending, to generate the picture P_moving with object moving trace. Specifically, the pixel values of the pictures P3 and P4 located in the image mask M_BG are added according to the image mask M_BG, and the pixel values of the pictures P3 and P4 located in the image mask M_X are blended according to the image mask M_X and the weighting, so as to generate the picture P_moving with object moving trace.

In one embodiment, the pictures P3 and P4 can be blended according to the image masks M_X and M_BG. For example, the pixel values of the picture P3 located in the image mask M_BG are kept, and the pixel values of the picture P4 located in the image mask M_X are kept. Then, the pixel values of the pictures P3 and P4 located at the border of the image masks M_X and M_BG can be blended according to a weighting, so as to generate the picture P_moving with object moving trace. By this way, the picture P_moving looks smoother.

To sum up, the camera device of the present invention generates a sharp picture with an object and a blurry picture with radial background radiated from the object via continuous shooting, and then generates a picture with object moving trace by merging the sharp picture and the blurry picture via image processing. As a result, general users can easily take the picture with object moving trace to show dynamic effect in the picture.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of generating pictures with an object moving trace, comprising:
    outputting a control signal to control a camera lens to capture a first picture at a first time, a second picture at a second time and a third picture at a third time;
    comparing the first picture and the second picture to generate a first image mask and a second image mask;
    keeping a first area of the first or second picture corresponding to the first image mask, and removing a second area of the first or second picture corresponding to the second image mask to generate a fourth picture; and
    blending the third picture and the fourth picture according to a weighting to generate a fifth picture with an object moving trace, comprises:
        keeping pixel values of the third picture in the second image mask according to the second image mask;
        keeping pixel values of the fourth picture in the first image mask according to the first image mask; and
        blending pixel values of the third picture and the fourth picture located at a border of the first and second image masks according to the weighting, to generate the fifth picture.

2. The method of claim 1, wherein the control signal indicates a continuous shooting speed, shutter speeds, apertures, ISO sensitivities and zoom-in/out for the first, second and third pictures.

3. The method of claim 2, wherein the control signal indicates short shutter speeds when capturing the first picture and the second picture, and the control signal indicates a long shutter speed and controlling the lens to simultaneously perform zoom-in or zoom-out when capturing the third picture.

4. The method of claim 1, wherein comparing the first picture and the second picture to generate the first image mask and the second image mask comprises:
    comparing pixel values of the first picture and the second picture at a same coordinate, to generate a comparison result; and
    generating the first image mask and the second image mask according to the comparison result.

5. The method of claim 4, wherein the pixel values of the first and second pictures are corresponding to the second image mask if the comparison result indicates that a pixel value difference of the first picture and the second picture is substantially equal to zero; and the pixel values of the first and second pictures are corresponding to the first image mask if the comparison result indicates that the pixel value difference of the first picture and the second picture is substantially not equal to zero.

6. The method of claim 4, wherein the pixel values of the first and second pictures are corresponding to the second image mask if the comparison result indicates that a pixel value difference of the first picture and the second picture is substantially smaller than a threshold; and the pixel values of the first and second pictures are corresponding to the first image mask if the comparison result indicates that the pixel value difference of the first picture and the second picture is substantially greater than the threshold.

7. The method of claim 1, wherein the first time is prior to the second time, and the second time is prior to the third time; or, the third time is prior to the first time, and the first time is prior to the second time.

8. The method of claim 1, wherein the first area displays an object, and the second area displays a background.

9. A camera device for generating pictures with object moving trace, comprises:
    a controller for outputting a control signal;
    a lens coupled to the controller for capturing a first picture at a first time, a second picture at a second time and a third picture at a third time according to the control signal; and
    a memory unit, coupled to the controller, for storing a program code to instruct the controller executing a process of generating pictures with object moving trace, wherein the process comprises:
        comparing the first picture and the second picture to generate a first image mask and a second image mask;
        keeping a first area of the first or second picture corresponding to the first image mask, and removing a second area of the first or second picture corresponding to the second image mask to generate a fourth picture; and
        blending the third picture and the fourth picture according to a weighting to generate a fifth picture with an object moving trace, comprises:
            keeping pixel values of the third picture in the second image mask according to the second image mask;

keeping pixel values of the fourth picture in the first image mask according to the first image mask; and blending pixel values of the third picture and the fourth picture located at a border of the first and second image masks according to the weighting, to generate the fifth picture.

10. The camera device of claim 9, wherein the control signal indicates a continuous shooting speed, shutter speeds, apertures, ISO sensitivities and zoom-in/out for the first, second and third pictures.

11. The camera device of claim 10, wherein the control signal indicates short shutter speeds when capturing the first picture and the second picture, and the control signal indicates a long shutter speed and controlling the lens to simultaneously perform zoom-in or zoom-out when capturing the third picture.

12. The camera device of claim 9, wherein comparing the first picture and the second picture to generate the first image mask and the second image mask comprises:

comparing pixel values of the first picture and the second picture at a same coordinate, to generate a comparison result; and generating the first image mask and the second image mask according to the comparison result.

13. The camera device of claim 12, wherein the pixel values of the first and second pictures are corresponding to the second image mask if the comparison result indicates that a pixel value difference of the first picture and the second picture is substantially equal to zero; and the pixel values of the first and second pictures are corresponding to the first image mask if the comparison result indicates that the pixel value difference of the first picture and the second picture is substantially not equal to zero.

14. The camera device of claim 12, wherein the pixel values of the first and second pictures are corresponding to the second image mask if the comparison result indicates that a pixel value difference of the first picture and the second picture is substantially smaller than a threshold; and the pixel values of the first and second pictures are corresponding to the first image mask if the comparison result indicates that the pixel value difference of the first picture and the second picture is substantially greater than the threshold.

15. The camera device of claim 9, wherein the first time is prior to the second time, and the second time is prior to the third time; or, the third time is prior to the first time, and the first time is prior to the second time.

16. The camera device of claim 9, wherein the first area displays an object, and the second area displays a background.

* * * * *